United States Patent
Rahman et al.

(10) Patent No.: US 11,096,078 B2
(45) Date of Patent: Aug. 17, 2021

(54) SYSTEMS AND METHODS FOR MANAGING CAPACITY AND COVERAGE IN COMMUNICATION NETWORKS

(71) Applicants: Mohammad Moshiur Rahman, Ottawa (CA); Nimal Gamini Senarath, Ottawa (CA); Remziye Irem Bor Yaliniz, Ottawa (CA); Hang Zhang, Nepean (CA)

(72) Inventors: Mohammad Moshiur Rahman, Ottawa (CA); Nimal Gamini Senarath, Ottawa (CA); Remziye Irem Bor Yaliniz, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/541,305

(22) Filed: Aug. 15, 2019

(65) Prior Publication Data

US 2020/0059809 A1 Feb. 20, 2020

Related U.S. Application Data

(60) Provisional application No. 62/719,482, filed on Aug. 17, 2018.

(51) Int. Cl.
| | |
|---|---|
| *H04W 24/10* | (2009.01) |
| *H04W 24/02* | (2009.01) |
| *H04W 16/28* | (2009.01) |
| *H04W 64/00* | (2009.01) |
| *H04W 48/18* | (2009.01) |
| *H04B 17/336* | (2015.01) |

(52) U.S. Cl.
CPC .......... *H04W 24/10* (2013.01); *H04B 17/336* (2015.01); *H04W 16/28* (2013.01); *H04W 64/003* (2013.01)

(58) Field of Classification Search
CPC ..... H04W 24/02; H04W 24/10; H04W 16/28; H04W 64/003; H04W 48/18; H04B 17/336
See application file for complete search history.

(56) References Cited

U.S. PATENT DOCUMENTS

2011/0306377 A1* 12/2011 Shibuya .............. H04W 72/082
 455/513
2014/0073322 A1* 3/2014 Henderson ............ H04W 24/02
 455/435.1

(Continued)

FOREIGN PATENT DOCUMENTS

| | | |
|---|---|---|
| CN | 101094482 A | 12/2007 |
| CN | 105764065 A | 7/2016 |
| WO | 2010105438 A1 | 9/2010 |

OTHER PUBLICATIONS

"Telecommunication management; Self-Organizing Networks (SON) Policy Network Resource Model (NRM) Integration Reference Point (IRP); Information Service (IS)"; 3GPP TS 28.628 V15.0.0 (Jan. 2018).

(Continued)

*Primary Examiner* — Yuwen Pan
*Assistant Examiner* — Hung K Du

(57) ABSTRACT

Systems and methods described for providing capacity and coverage hole analysis in next generation wireless networks (e.g. 5G networks). Provided is a network function comprising a network interface for receiving data from, and transmitting data to, a plurality of network functions connected to a within a communication network; a processor; and a non-transient memory for storing instructions executable by the processor to cause the network function to receive a request for capacity and coverage hole (CCH) information from a capacity and coverage hole analysis (CCHA) consumer, collect the CCH information responsive (Continued)

to the request; and determine a capacity and coverage hole profile that is indicative of at least one of a network coverage sufficiency and coverage service quality based at least in part on the CCH information.

17 Claims, 10 Drawing Sheets

(56) References Cited

U.S. PATENT DOCUMENTS

| | | |
|---|---|---|
| 2014/0369336 A1 | 12/2014 | Prakash et al. |
| 2015/0057005 A1 | 2/2015 | Sun et al. |
| 2017/0063621 A1* | 3/2017 | Sanneck ............. H04L 41/0813 |
| 2017/0156117 A1* | 6/2017 | Zhu ..................... H04W 52/243 |
| 2017/0245176 A1* | 8/2017 | Murphy ................ H04W 28/08 |
| 2019/0174344 A1* | 6/2019 | Karelia ................. H04W 24/10 |
| 2019/0174498 A1* | 6/2019 | Samdanis ......... H04W 72/0453 |

OTHER PUBLICATIONS

"Telecommunication management; Study on Network Management (NM) centralized Coverage and Capacity Optimization (CCO) Self-Organizing Networks (SON) function"; 3GPP TR 32.836 V12.0.0 (Sep. 2014).

* cited by examiner

SYSTEMS AND METHODS FOR MANAGING CAPACITY AND COVERAGE IN COMMUNICATION NETWORKS

CROSS-REFERENCE TO RELATED APPLICATIONS

This application claims the benefit of priority to U.S. Provisional Application Ser. No. 62/719,482 filed Aug. 17, 2018, the contents of which are hereby incorporated by reference.

FIELD OF THE INVENTION

The present invention generally pertains to the field of communication networks, and particular embodiments or aspects relate to managing capacity and coverage in communication networks.

BACKGROUND

Cellular network coverage and capacity are two very closely related (sometimes interdependent) characteristics. These characteristics define the capability of a communication network to provide services with certain Quality of Service/Quality of Experience (QoS/QoE) to a number of User Equipment (UEs). Recent developments in communication networks, such as so called 5G communication networks, introduce the concept of network slice instance (NSI) and network slice subnet instance (NSSI). In a virtualized communication network, such as a 5G communication network, optimization of capacity and coverage, commonly referred to as capacity and coverage hole optimization (CCO), requires analyzing a variety of information available in the network to provide a preferred (i.e. "optimal") solution to alleviate the capacity and coverage problems in a given network situation.

Network coverage in the positive sense describes the geographic region(s) in which UEs are in operational reach of at least one radio access network node (RAN node). Sub-locations within the geographic region(s) that may have limited to no service by any network RAN nodes are often referred to as "coverage holes". The term coverage hole is defined as a geographic subregion in which a UE is unable to receive sufficient signal strength from a RAN node when there is a zero-loading condition (i.e. no UE's being served the network). In practice this definition is loosened such that a coverage hole is a geographic subregion in which a UE is unable to receive sufficient signal strength when the network does not have a loading problem (e.g., number of UEs currently being served do not exceed the coverage capacity of the network in the subregion).

A capacity problem exists when the received signal strength of a UE connected to the network is insufficient to support a desired/required QoS/QoE to meet the UE's connectivity needs.

In order to manage capacity and coverage in a communication network it is important to identify whether a UE is suffering from a network coverage related issue or alternatively has insufficient capacity due to other network issues e.g., network loading while within the coverage of the network. In a virtual network, when the core and access network are shared by multiple network operators, identifying the network coverage and capacity related problems, and finding optimal solutions to resolve them, require real time analysis of a large volume of network diagnostic data.

Accordingly, there is a need for systems and methods that support capacity and coverage hole analysis (CCHA) in next generation networks, such as 5G networks, in order to facilitate network management to alleviate the perceived capacity limitations. An objective of capacity and coverage hole analysis (CCHA) is to provide optimal (i.e. sufficient) coverage to connected UEs while maintaining their capacity requirements.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

In one broad aspect, provided is a network function comprising a network interface for receiving data from, and transmitting data to, a plurality of network functions connected to a within a communication network; a processor; and a non-transient memory for storing instructions executable by the processor to cause the network function to receive a request for capacity and coverage hole (CCH) information from a capacity and coverage hole analysis (CCHA) consumer, collect the CCH information responsive to the request, and determine a capacity and coverage hole profile that is indicative of at least one of a network coverage sufficiency and coverage service quality based at least in part on the CCH information.

In a further aspect of the network function, the instructions are further executable to transmit to the CCHA consumer the determined capacity and coverage hole profile.

In another aspect, the request for responsive information is transmitted to the MMSP, and the instructions are further executable to create a request for a measurement job pertaining to the CCH information for one of or more (R)ANs; and determine the received responsive information based at least in part on results collected from the measurement job.

In an embodiment, the instructions executable to collect the CCH information are further executable to collect the CCH information based on continuous monitoring by a CCHA monitoring function in the network function.

In another embodiment, the CCHA monitoring function is a RAN CCHA monitoring function, and the instructions are further executable to request that a RAN CCHA detection/prediction function detect or predict the CCH information responsive to a RAN request.

In one aspect, the RAN CCHA detection/prediction function collects information required to analyze the CCH based on the RAN request.

In another aspect, the information required to analyze the CCH is collected based on periodic reporting from a user equipment (UE).

In one variation, the periodic reporting from the UE is provided in accordance with a tuple format that includes a geographic location, a quality of service (QoS) associated with at least one service application, and at least one of a signal to noise ratio (SNR) and a signal to noise interference ration (SNIR).

In one embodiment, the instructions are further executable to request a NSS CCHA detection/prediction function to detect or predict the CCH information responsive to a NSS request.

In another embodiment, the NSS CCHA detection/prediction function collects information required to analyze the CCH based on the NSS request.

In yet another embodiment, the instructions are further executable to request a NSI CCHA detection/prediction function to detect or predict CCH information responsive to a NSI request.

In one aspect, the NSI CCHA detection/prediction function collects information required to analyze the CCH based on the NSI request.

In another broad aspect, provided is a network function comprising a network interface for receiving data from and transmitting data to network functions connected to a network; a processor; and a non-transient memory for storing instructions executable by the processor to cause the network function to generate a capacity and coverage hole analysis (CCHA) policy based on capacity and coverage hole (CCH) information in of the network, the CCH information being indicative of a network coverage sufficiency and coverage service quality, the CCHA policy defined in accordance with the network coverage sufficiency and coverage service quality, and apply the generated CCHA policy in modifying capacity and coverage hole conditions within the network In one aspect, the instructions are further executable to generate the CCHA policy function based at least in part on a CCHA algorithm function.

In another aspect, the CCHA system is implemented in accordance with a hierarchical interface architecture.

In another variation, the hierarchical interface architecture comprises at least one of a physical network component and a virtual network component.

In one embodiment, the physical network component comprises a radio access network (RAN).

In another embodiment, the virtual network component comprises at least one of a network slice sub-net (NSS) and a network slice instance (NSI).

In yet another broad aspect, provided is a communication system comprising a first network function, a second network function, and a communication interface supporting a communication between the first network function and the second network function, wherein:
the first network function is configured to:
receive a request for capacity and coverage hole (CCH) information from a capacity and coverage hole analysis (CCHA) consumer;
collect the CCH information responsive to the request; and
based at least in part on the CCH information, determine a capacity and coverage hole profile that is indicative of at least one of a network coverage sufficiency and coverage service quality;
the second network function is configured to:
obtain the capacity and coverage hole profile from the first network function via the communication interface;
generate a CCHA policy based on the capacity and coverage hole profile; and
apply the generated CCHA policy in modifying capacity and coverage hole conditions within the network.

In one embodiment, the communication system further comprises the CCHA consumer and a second communication interface, wherein the CCHA consumer is configured to send the request for CCH information to the first network function via the second communication interface.

In one aspect, the communication system further comprises at least one of following functions which is configured to provide the CCH information to the first network function:
a data analytics management database (DAM DB);
a core network management function (CNMF);
one or more core network functions or nodes;
a measurement management service provider (MMSP); and
one or more radio access network ((R)AN) nodes.

In another embodiment, the communication system further comprises a CCHA monitoring function configured to perform continuous monitoring to collect the CCH information detected or predicted by a CCH detection/prediction function.

In another aspect of the communication system, the CCH detection/prediction function is inside or outside the communication system.

In an embodiment, a network function is provided. The network function comprising: a network interface for receiving data from and transmitting data to network functions connected to a network; a processor; and a non-transient memory for storing instructions that when executed by the processor cause the network function to be configured to: receive requests from a capacity and coverage hole analysis (CCHA) consumer for capacity and coverage hole information; collect information responsive to the request; determine a capacity and coverage hole profile; transmit toward the CCHA consumer the determined capacity and coverage hole profile.

In an implementation, the network function is further operative to collect the information responsive to the request by: transmitting a request for responsive information; and, receiving the responsive information, and wherein the capacity and coverage hole profile is further based on the received responsive information. The request for responsive information may be transmitted to any one of: a data analytics management database (DAM DB); a core network management function (CNMF); core network functions/nodes; a measurement management service provider (MMSP); or, a radio access network ((R)AN) nodes.

In an implementation, the request for responsive information is transmitted to the MMSP, and wherein the request for responsive information further comprises a request to create a measurement job for one of or more (R)ANs, and wherein the received responsive information further comprises results collected from the measurement job.

In an embodiment a network function is provided. The network function comprising: a network interface for receiving data from and transmitting data to network functions connected to a network; a processor; and a non-transient memory for storing instructions that when executed by the processor cause the network function to be configured to: generate a CCHA policy based on capacity and coverage hole information in the network; and, apply the generated CCHA policy to improve capacity or coverage hole within the network.

In an implementation, the network function is further operative to apply the generated CCHA policy by: transmitting to a core network function a request to update one or more control plane functions based on the generated CCHA policy.

In an implementation, the network function is further operative to apply the generated CCHA policy by: transmitting to an infrastructure management function an infrastructure modification request to modify infrastructure of the network to meet the generated CCHA policy. In an implementation the infrastructure modification request specifies modification to at least one of: DL power adjustment of transmission units; Antenna tilt/azimuth adjustment of transmission units; Sending instruction to change UL transmission frequency to one that does not suffer from the coverage issue in the CH area; Addition of new BSs in the CH area; and, Cell switch ON/OFF.

In an embodiment the network function is further operative to generate the CCHA policy by: transmitting to a CCHA algorithm function a request to determine an algorithm to address a CCH problem identified from the received responsive information; and, receiving from the CCHA algorithm function the determined algorithm based on the received responsive information; and wherein the CCHA policy is generated based on the determined algorithm.

Further embodiments may include systems and methods as further described below.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

DETAILED DESCRIPTION

In some embodiments, systems and methods are provided for managing the capacity and coverage hole problem in 5G networks. The systems and methods include a management data analytics framework and procedure for detecting coverage hole and capacity related problems in the physical e.g., radio access network (RAN) and virtual networks (NSIs, NSSIs).

The present application includes a number of terms and acronyms which are currently in common usage in next generation (5G) network design and standards groups. The specific terms used in practice may be replaced in the future with different acronyms or descriptive labels that refer to the same functional items:

DAM Data Analytics Management
CCH Capacity and Coverage Hole
CCHA Capacity and Coverage Hole Analysis
NSI Network Slice Instance
NSSI Network Slice Subnet Instance
RAN Radio Access Network
RANMF Radio Access Network Management Function
InfMF Infrastructure Management Function
NSMF Network Slice Management Function
NSSMF Network Slice Subnet Management Function
CN Core Network
NWDAF Network Data Analytics Function
AMF Access and Mobility Management Function
PCF Policy Control Function
UDR Unified Data Repository
UDSF Unstructured Data Storage Function
gNB Next generation NodeB
eNB Enhance NodeB
UE User Equipment
QoS Quality of Service
QoE Quality of Experience
I/P Input
O/P Output In an embodiment, a system is provided to utilize data analytics techniques to analyze network capacity issues and to detect coverage holes in a communication network. In the embodiment, the system includes a hierarchical network management and data analytics framework in the network that is utilized for the CCHA and to devise potential solutions to alleviate the capacity and coverage hole (CCH) problem.

Figure 1:
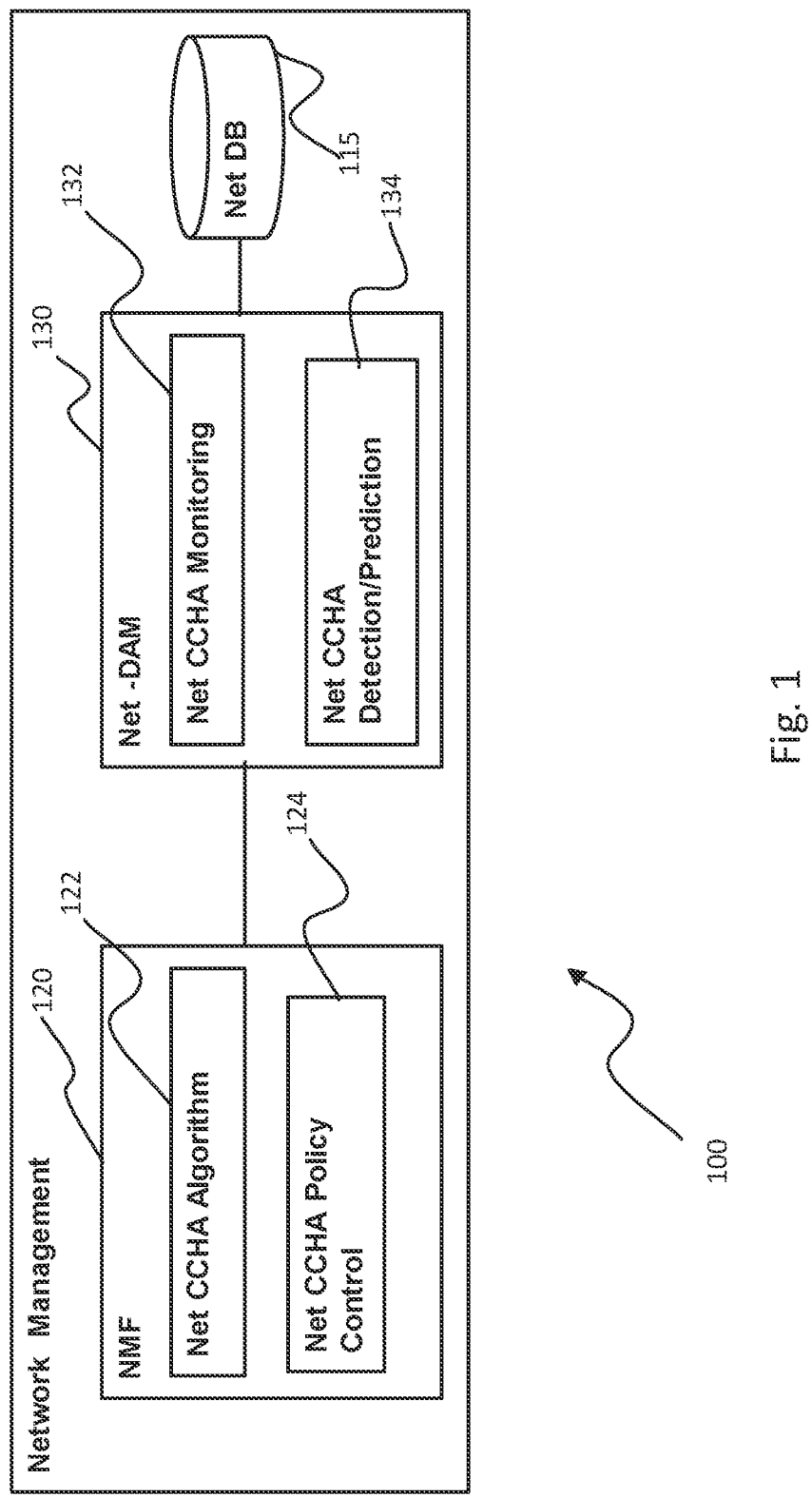
FIG. 1 is a block diagram of an embodiment of a network management system.

FIG. 1 is a block diagram of an embodiment of a network management system 100 operative to provide CCHA. The network management system 100 includes a Network Management Function (NMF) 120 in communication with a Network Data Analytics Management (Net-DAM) 130 entity. In some embodiments, the network management system 100 may further include a datastore (Net DB) 115 which may be used to store CCHA-related data of the network that is collected and/or used by the network management system 100. It is to be noted that different functions (e.g., NMF, Net-DAM, Net DB) can be logically implemented as a common functional unit or as separate functional entities.

The NMF 120 performs the management functions for CCHA of the network. In the embodiment of FIG. 1, the NMF 120 includes the operational features of a Net CCHA Algorithm function 122 which provides the required algorithm for CCHA operations, as well as Net CCHA Policy Control 124 which provides the required policies to alleviate a detected CCH problem.

The Net-DAM entity 130 performs the monitoring, detection, and prediction operations that may be used for CCHA management. In the embodiment of FIG. 1, the Net-DAM entity 130 includes Net CCHA Monitoring 132 operative to monitor the CCH situation of the network and Net CCHA Detection/Prediction 134 operative to detect and/or predict the capacity and coverage holes in the network.

Figure 2:
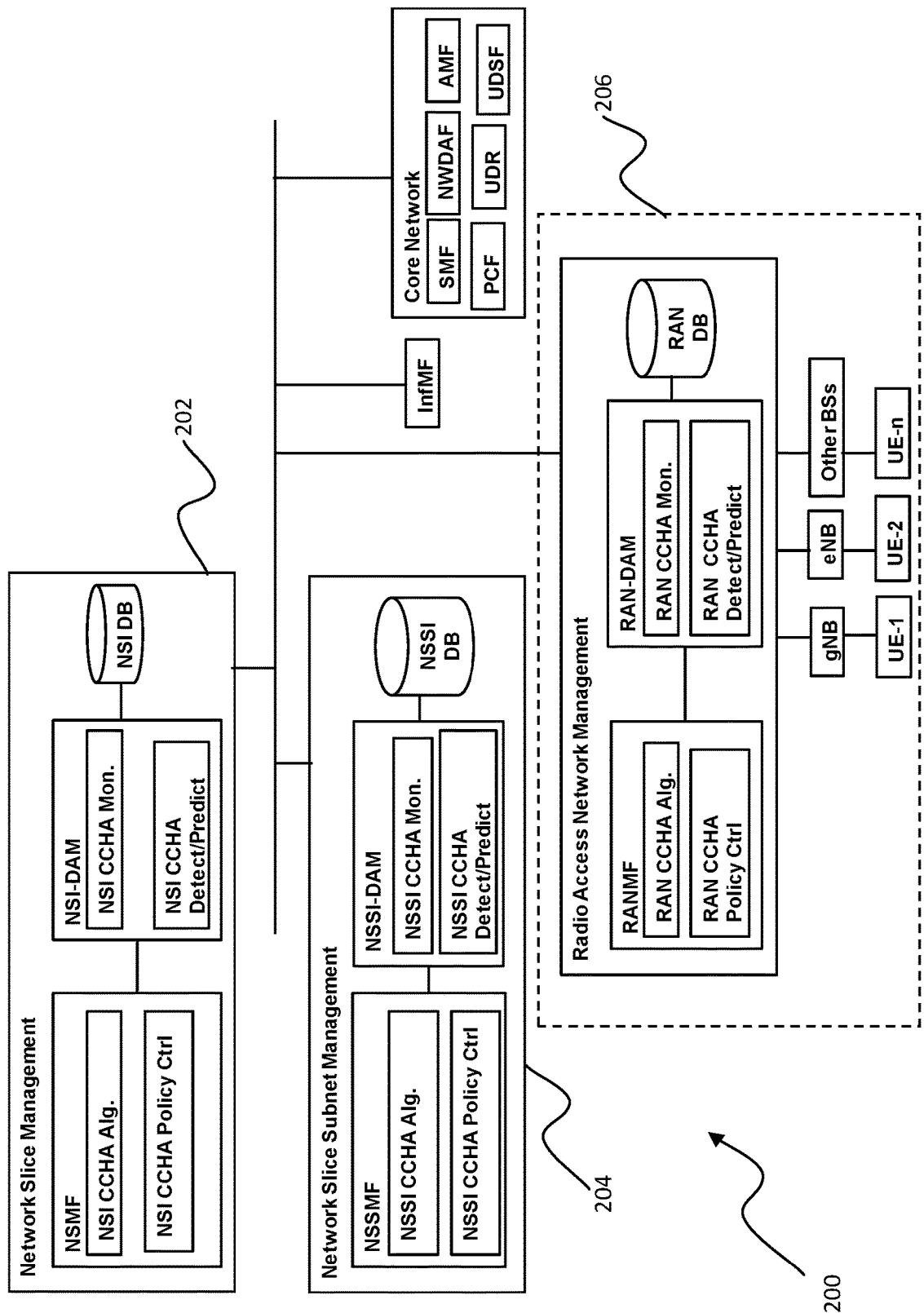
FIG. 2 is a block diagram of an embodiment of a network management system.

FIG. 2 illustrates an embodiment of a network management system 200 that may be implemented in a service-based architecture (SBA) for network management entities (e.g. network slice, network slice subnet, and radio access network) to provide CCHA in a network. The embodiment of FIG. 2 provides SBA for a CCHA architecture which is flexible and extensible. In the embodiment of FIG. 2, a network management system 200 may include one or more of each of a network slice management entity 202, a network slice subnet management entity 204, and a radio access network management entity 206. Typically the network management system 200 may include a single radio access network management entity 206 and, depending upon the virtual network configuration of the network, one or more network slice management entities 202, and a plurality of network slice subnet management entities 204. Each of the network slice management entity 202, network slice management entity 202, network slice subnet management entity 204, and radio access network management entity 206 include a local version of the components of a network management entity 100 as illustrated in the embodiment of FIG. 1. The components in the entities of FIG. 2, however, may each be tailored for the operational environment of that entity. For instance, the network slice management entity 202 may include CCHA policy control relevant for the slice instance(s) related to the network slice management entity 202 and may differ from policy controls implemented in the network slice management entity 202, network slice subnet management entity 204, and radio access network management entity 206.

The embodiment of FIG. 2 also illustrates the relationship between the network management system 200 with the infrastructure management function (InfMF), different core network (CN) or control function (e.g., NWDAF, AMF, SMF, PCF, UPF, UDR, UDSF, etc. [2]) and radio access network nodes (e.g., gNB, eNB, UE) in order to interact to obtain and provide information for CCHA.

Figure 3:
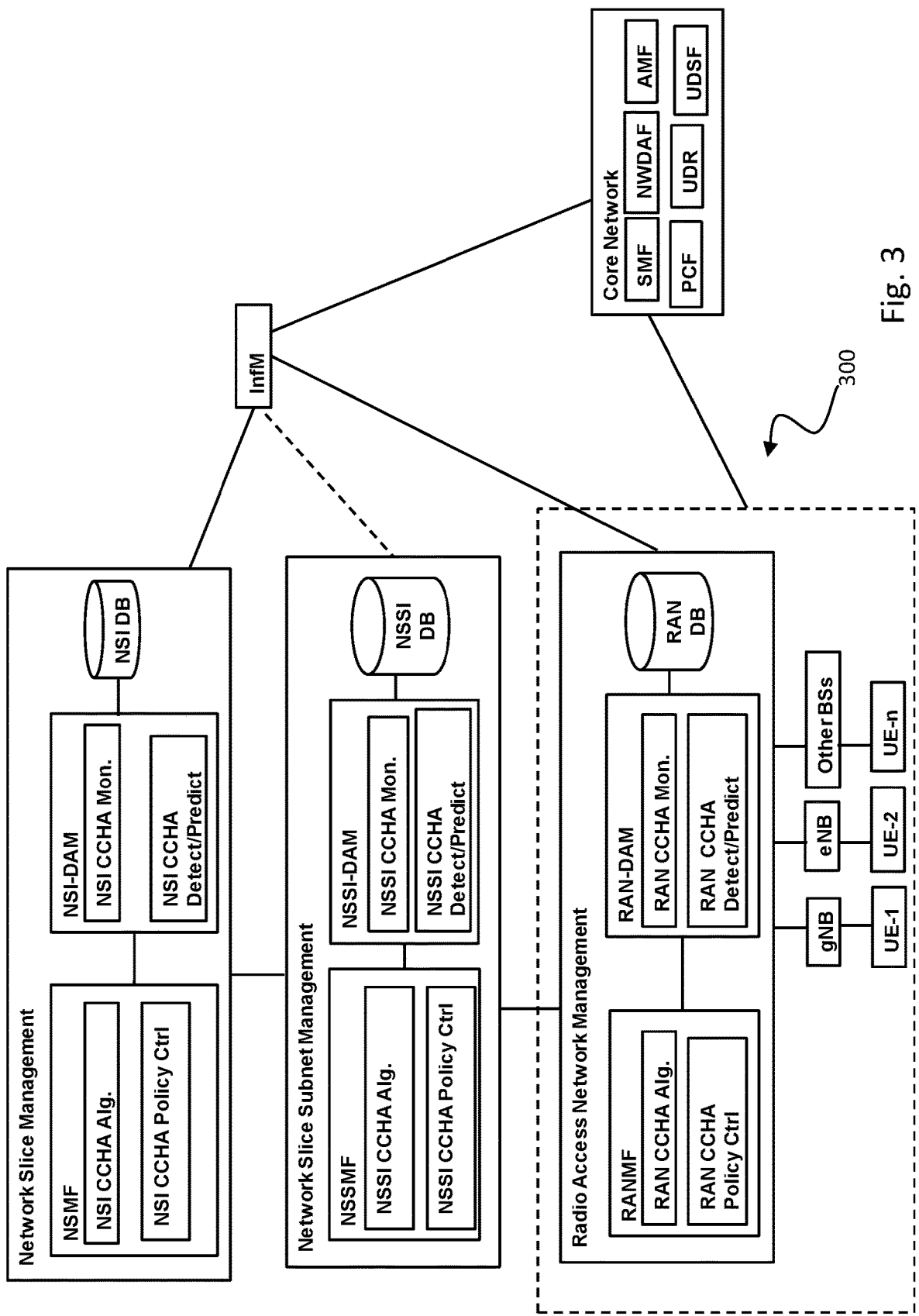
FIG. 3 is a block diagram of an embodiment of a network management system.

While the embodiment of FIG. 2 illustrates a SBA for the CCHA architecture, other types of network hierarchies and connections (e.g. interface-based) are contemplated. For example, FIG. 3 illustrates an alternate network management system 300 using an interface-based (hierarchical) architecture for CCHA in next generation networks, such as 5G. The embodiment of FIG. 3 may be convenient, for instance, for providing procedures for CCHA and optimization for a RAN.

Figure 4A:
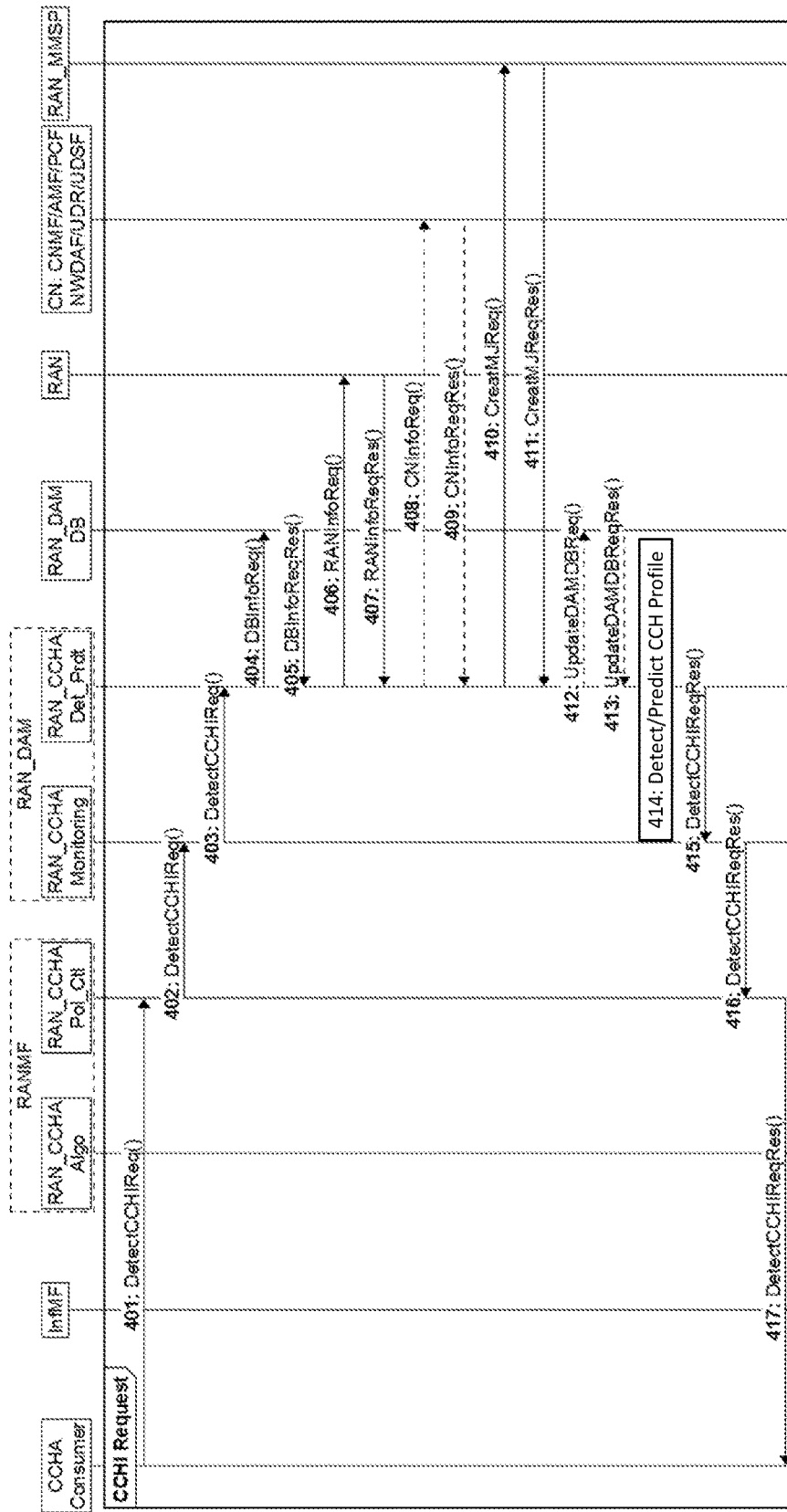
FIGS. 4A and 4B are signaling diagrams for an embodiment of coverage and capacity hole analysis.

Referring to FIG. 4A, a signalling diagram is presented for an embodiment of signaling exchange among different network entities for RAN CCHA. In a first embodiment, a RAN CCHA information request is sent by a RAN CCHA consumer.

In step 401, a RAN CCHA consumer (e.g., a network operator) requests for CCH information to a RANMF via DetectCCHIReq( ).

In step 402, the RAN CCHA policy control function in a RANMF which is a RAN-DAM MDAS consumer, requests via DetectCHIReq( )operation, the RAN-DAM (i.e., the RAN CCH monitoring function) that is a RAN-DAM MDAS provider to provide information on potential capacity deficiencies and capacity holes in the RAN.

In step 403, the RAN CCHA monitoring function requests the RAN CCHA detection/prediction function to detect/predict CCH for the requested RAN via the DetectCCHIReq( ) function.

The RAN CCHA detection/prediction function collects information required to calculate/analyze the CCH in the requested RAN. The information may include, for instance:

a. Received SNR/SNIR as reported by the UEs in the RAN
  b. Mobility information of the UEs e.g.,
    i. handover failure,
    ii. inter-RAT handover: from 5G to any 3GPP (e.g., 4G, 3G, et.) or non-3GPP networks. This information may be collected from AMF and/or NWDA.
  c. link failure experienced by the UEs in a geographic area (e.g., the last cell id, gNB id, tracking area id, etc.)
  d. weak coverage area: the area (e.g., the last cell id, gNB id, tracking area id, etc.) where the reported signal to interference and noise ratio (SINR) is insufficient for meeting the SLA requirements of certain services/applications depending on the loading condition of the network.
  e. areas with mismatch between DL and UL channels In step 404, the RAN CCHA detection/prediction function may collect information by transmitting a request for database information stored in the RAN DAM DB. IN step 405 the RAN_DAM DB returns the requested data.

Optionally, in step 406, the RAN CCHA detection/prediction function can request, and receive in step 407 information from the RAN nodes using the RANInfoReq( ) operation.

If the data available from the RAN DAM DB is not sufficient, in step 408 the RAN CCHA detection/prediction function may also transmit requests to obtain information from different control plane functions in step 409. The information may include, for instance:

a. AMF: mobility, connectivity, location information of UEs
  b. PCF: mobility related policy information
  c. SMF: routing information
  d. NWDAF: QoS/QoE for UEs and the applications used by the UEs, as well as any other relevant control plane data analytics results
  e. Data from other data analytics functions, e.g., infrastructure data analytics function, NSI data analytics function, NSSI data analytics function, etc.
  f. UDR/UDSF: structured/unstructured data relating to UE connectivity, mobility and policy If the RAN CCHA detection/prediction function needs new measurements, in step 410 the RAN CCHA detection/prediction function transmits a request to the RAN measurement management service provider (RAN_MMSP) to create specific measurement jobs (MJ) for RAN nodes. In step 411 the RAN_MMSP returns to the RAN_CCHA the requested data collected by the MJ. The RAN CCHA detection/prediction function can also collect data from any other data analytic functions in the network.

The RAN CCHA detection/prediction function can (optionally) in step 412 update the RAN_DAM DB with the collected information mentioned above via UpdateDAMDBReq( ) operation. In step 413 the RAN_DAM DB may acknowledge the update request to receive the collected information, an/or may provide additional data to the RAN_CCHA.

Using the above information, in step 414 the RAN CCHA Detection/Coverage function computes a capacity info and coverage hole profile for the RAN, that includes:

a. Coverage holes in the RAN
  b. Coverage-insufficiency areas on the RAN
  c. Coverage hole and coverage-insufficiency analysis results from the associated NF (e.g., gNB, eNB, other BSs, APs, etc.)-DAM function (if available)
  d. number of active UEs in the RAN e. the QoS/QoE profile of each UE in the RAN
f. average QoS/QoE profile of the UEs in the RAN
g. number of active sessions in the RAN
h. QoS/QoE profile of each session in the RAN, etc.

In step 415, the RAN CCHA detection/prediction function transmits responding CCH information in the form of the CH detection/prediction results to the RAN CCHA monitoring function.

In step 416, the RAN CCHA monitoring function transmits the responding CCH information (i.e. the CH detection/prediction results) to the RANMF. In step 417, the RANMF relays the responding CCH information to the CCHA consumer.

Figure 4B:
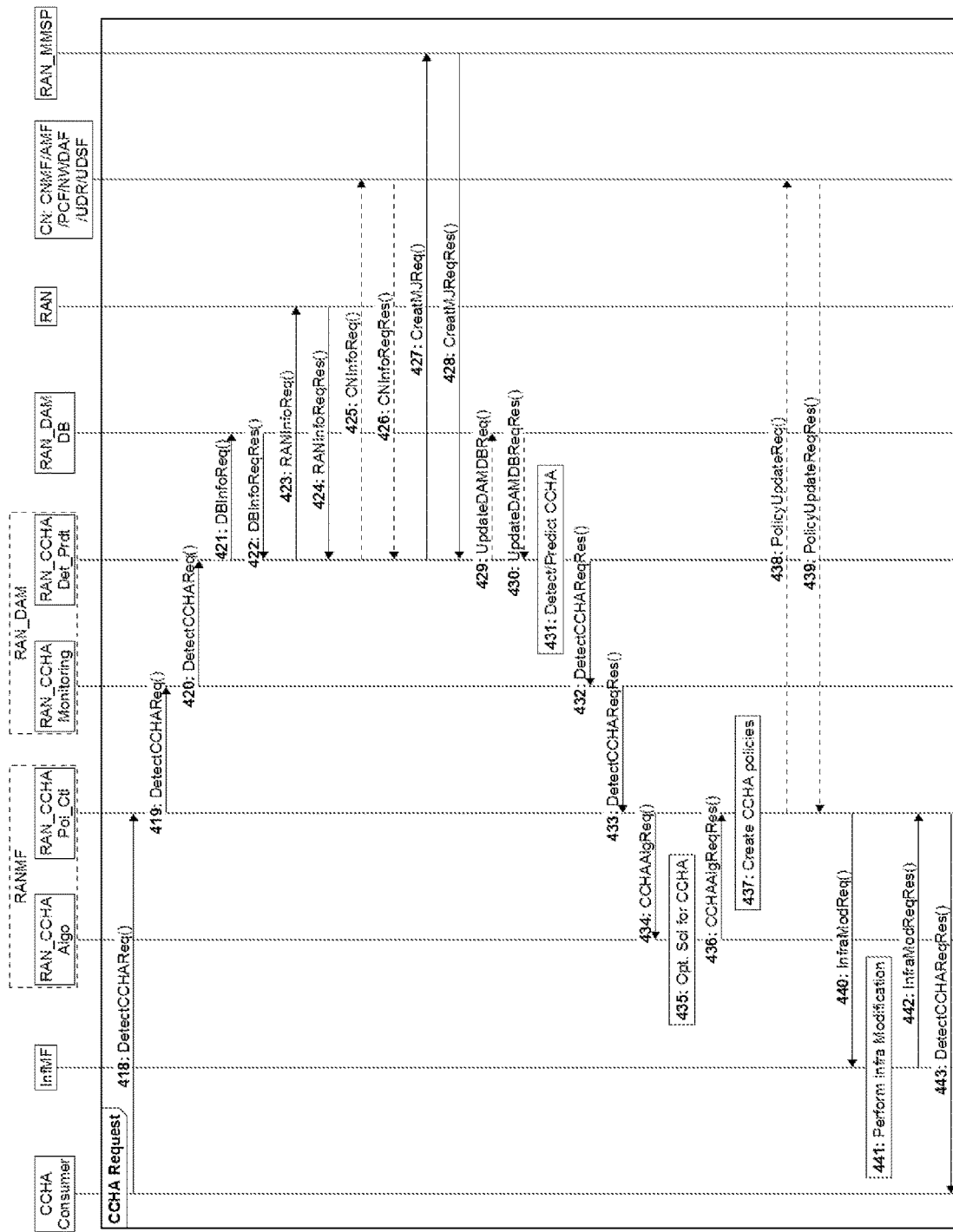

FIG. 4B illustrates an alternate embodiment in which the CCHA consumer may both request CCH information and request potential solutions to optimize or alleviate a potential CCH condition. In step 418 the CCHA consumer transmits a DetectCCHAReq( ) to the RANMF that includes a request for CCH information along with an additional request for a solution to a potential CCH condition. Steps 418 to 431 are functionally equivalent to steps 401 to 416 above with the exception that step 418 includes an additional request for CCH solutions. The effect of this request, after executing steps 419 to 431, is to cause the RAN_DAM, in step 432, to transmit a DetectCCHAReqRes( ) to the RAN_CCHA Monitoring entity.

In step 433 the RAN CCHA monitoring function transmits the CCH results to the RAN CCHA policy control function of the RANMF.

In step 434, the policy control function can then transmit to the RAN CCHA algorithm function a request to devise an appropriate algorithm/steps to be taken to alleviate the CCH problem.

In step 435, the RAN CCHA algorithm function prepares an optimized solution for CCH problem alleviation based on the received CCH results. In step 436, the RAN CCHA algorithm transmits a response indicating the determined optimized solution for the CCH problem to the CCHA policy control function.

In step 437, the RAN CCHA policy control function creates/updates policies according to the solution received from the RAN_CCHA algorithm function.

In step 438, the RAN_CCHA policy control function may send one or more policy suggestions in the form of a policy update request to a core network management function (CNMF) e.g., a NSSMF/NSMF, which in turn might update policies for corresponding control plane function (e.g., AMF, PCF, NWDAF). In step 439, the CNMF transmits an acknowledgement to the RAN_CCHA policy control function indicative of any policy changes or updates taken in response to the policy update request.

If infrastructure modification is needed, in step 440 the RAN_CCHA policy control function transmits a corresponding infrastructure modification request to the infrastructure management function (InfM), e.g., a. DL power adjustment of transmission units
b. Antenna tilt/azimuth adjustment of transmission units
c. Sending instruction to change UL transmission frequency to one that does not suffer from the coverage issue in the CH area
d. Addition of new BSs in the CH area
e. Cell switch ON/OFF In step 441, the InfMF performs the required infrastructure modifications and in step 442, updates the RAN_CCHA policy control function regarding the modifications made. In step 443 the RAN_CCHA policy control function transmits to the CCHA consumer a response to the initial request. In some implementations, the InfMF may be operative to use its own DAM function to identify an optimal physical modification policy. In practice, the InfMF can also be a part of the RANMF.

If the InfMF cannot perform certain modification operation (e.g. addition of a new BS) on the RAN because RAN CCHA consumer does not have the required resources or there is no pre-established agreement (e.g., to add resources if needed), a negotiation can start between the InfMF and the RAN CCHA consumer. And the RAN CCHA consumer might add (lease) additional resources from the InfM and the corresponding service level agreement (SLA) is done by the two parties.

In case, such negotiation is not possible, the InfMF informs the RANMF (i.e., the RAN CCHA Policy Control function) that the required network modification is not possible. In turn, the RANMF informs the CCHA consumer accordingly.

Figure 5A:
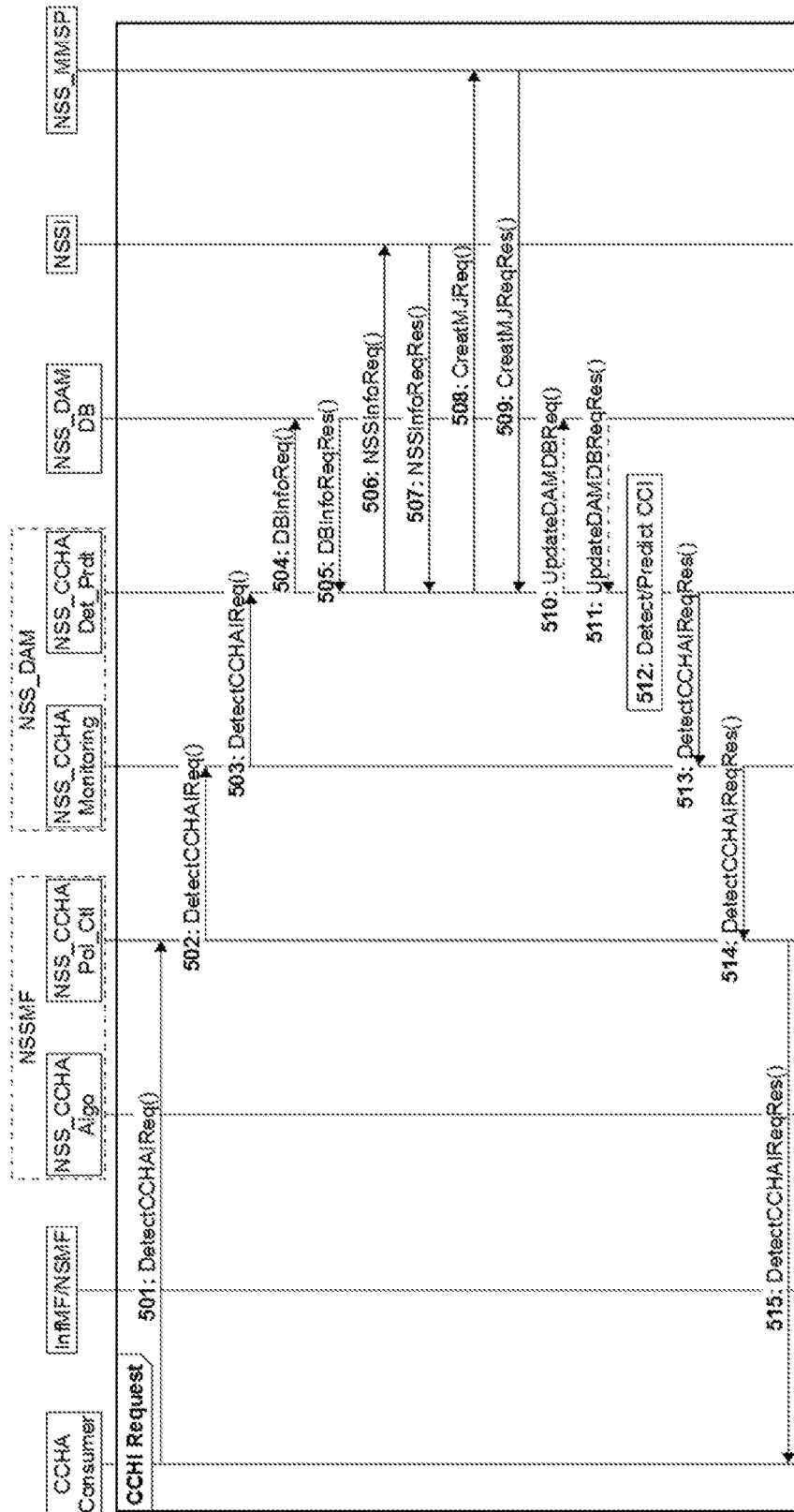
FIGS. 5A and 5B are signaling diagrams for an embodiment of coverage and capacity hole analysis.

Referring to FIG. 5A, in an embodiment, procedures for applying CCHA and optimization for a NSSI are presented.

In step 501, an NSSI CCHA consumer (e.g., a network/sub-network operator) requests for CCH information to a NSSMF via DetectCCHIReq( ). In step 502, the NSS CCHA policy control function in a NSSMF, which is a NSS-DAM MDAS consumer, requests via DetectCHReq( )operation, the NSS-DAM (i.e., the NSS CH monitoring function), that is a NSS-DAM MDAS provider, to provide information on potential capacity deficiencies and capacity holes in the NSS.

In step 503, the NSS CCHA monitoring function of the NSS_DAM transmits to the NSS CCHA detection/prediction function a request to detect/predict CCH for the requested NSS via the DetectCCHIReq( ) function.

The NSS CCHA detection/prediction function collects information required to calculate/analyze the CCH in the requested NS. The information may include, for instance:

a. Received SNR/SNIR as reported by the UEs in the NSS
b. Mobility information of the UEs e.g.,
c. handover failure,
d. inter-RAT handover: from 5G to any 3GPP (e.g., 4G, 3G, etc.) or non-3GPP networks. This information may be collected from AMF and/or NWDA.
e. link failure experienced by the UEs in a geographic area (e.g., the last cell id, gNB id, tracking area id, etc.)
f. weak coverage area: the area (e.g., the last cell id, gNB id, tracking area id, etc.) where the reported SINR is insufficient for meeting the SLA requirements of certain services/applications depending on the loading condition of the network.
g. areas with mismatch between DL and UL channels In step 504, the NSS CCHA detection/prediction function transmits to the NSS DAM DB a request for the required data. In step 505 the NSS_DAM DB returns the requested data to the NSS_CCHA detection/prediction function.

Optionally, in step 506 the NSS CCHA detection/prediction function can transmit requests to the NSSI in order to collect information from the NSS nodes using the NSSInfoReq( ) operation. If applicable, in step 507 the NSSI returns the requested information. The NSS CCHA detection/prediction function can also collect data from any other data analytic functions in the network.

Optionally, if the NSS CCHA detection/prediction function needs new measurements, in step 508 it may transmit to the NSS measurement management service provider (MMSP) a request to create specific measurement jobs (MJ)

for NS nodes. In step 509 the NSS_MMSP transmits to the NSS CCHA detection/prediction function the results of any MJ.

In optional step 510 the NSS CCHA detection/prediction function can (optionally) transmit an update request to the NSS_DAM DB to provide an update with the collected information mentioned above via UpdateDAMDBReq( ) operation. In step 511 the NSS_DAM DB transmits an update acknowledgement to the NSS CCHA detection/prediction function. In some implementations the NSS_DAM DB may further transmit additional updated information responsive to the NSS CCHA detection/prediction function request for information (e.g. DBInfoReq( )).

In step 512, using the above collected information, the NSS CCHA

Detection/Coverage function computes a capacity info and coverage hole profile for the NS, that includes one or more of the following:
 a. Coverage holes in the NSS.
 b. Coverage-insufficiency areas on the NS
 c. Coverage hole and coverage-insufficiency analysis results from the associated NF (e.g., gNB, eNB, other BSs, APs, etc.)-DAM function (if available)
 d. number of active UEs in the NSS
 e. the QoS/QoE profile of each UE in the NSS
 f. average QoS/QoE profile of the UEs in the NS
 g. number of active sessions in the NSS
 h. QoS/QoE profile of each session in the NS, etc.

In step 513, the NSS CCHA detection/prediction function then transmits the CH detection/prediction results to the NSS CCHA monitoring function.

In step 514, the NSS CCHA monitoring function transmits the results to the NSSMF. In step 515, the NSSMF transmits the results to the CCHA consumer as a response to the initial request.

Figure 5B:
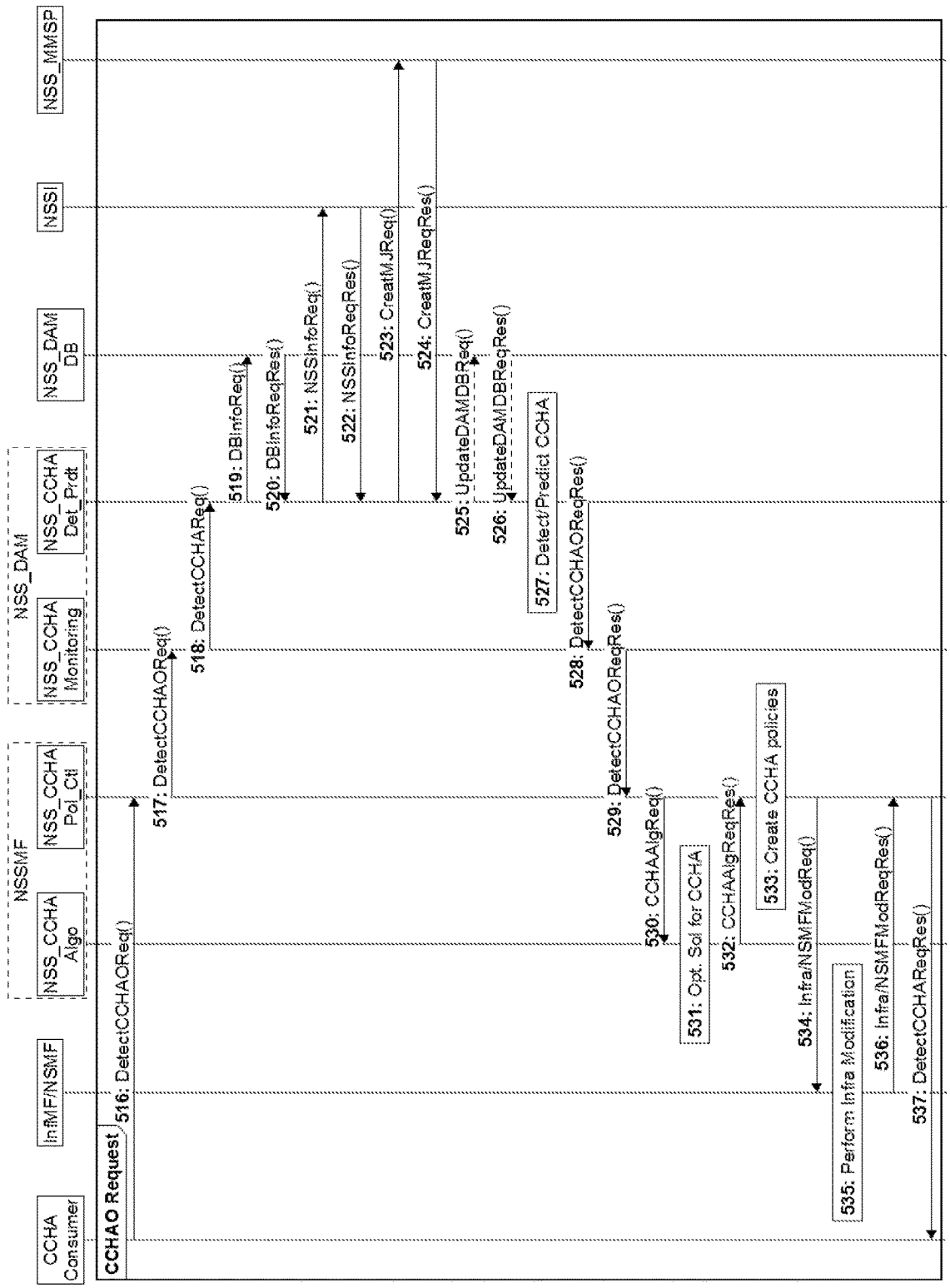

Referring to FIG. 5B, in an embodiment the CCHA consumer may obtain both NSSI CCHA Information and request potential solutions to optimize or alleviate a potential CCH condition. In step 516 the CCHA consumer transmit to the NSS CCHA policy control function a request for CCH information and a request for a solution to a potential CCH situation via a DetectCCHAReq ( ). Steps 517 to 529 are functionally equivalent to steps 502 to 515 above with the exception that step 516 included an additional request for CCH solutions.

In step 529, the NSS CCHA monitoring function forwards the CCH results to the NSS CCHA policy control function of the NSSMF.

In step 530, the NSS CCHA policy control function can transmit a request to the NSS CCHA algorithm function to devise appropriate algorithm to alleviate the CCH problem, including the CCH information.

In step 531, the NSS CCHA algorithm function prepares, based on the received CCH information, an optimized solution for CCH problem alleviation for the identified CCH problem.

In step 532, the NSS CCHA algorithm transmits to the CCHA policy control function a response that includes the optimized solution and/or additional results based on the CCH information.

In step 533, the NSS CCHA policy control function creates/updates policies according to the solution received from the NSS CCHA algorithm function.

If infrastructure modification is needed, in step 534 the NSS CCHA policy control function transmits a corresponding infrastructure modification request to the infrastructure management function (InfMF), or the corresponding NSMF, e.g., based on the created/updated policies. The infrastructure modification request may include, for instance, any of:
 a. DL power adjustment of transmission units
 b. Antenna tilt/azimuth adjustment of transmission units
 c. Sending instruction to change UL transmission frequency to one that does not suffer from the coverage issue in the CH area
 d. Addition of new Base Stations (R)ANs in the CH area
 e. Cell switch ON/OFF The InfMF/NSMF may use its own DAM function to map the virtual nodes to the physical nodes and to find the optimal physical modification policy. In practice, the InfMF can also be a part of the NSMF.

In step 535, the InfMF/NSMF performs the modifications based on the received policies, and in step 536 transmits an update to the NSS CCHA policy control function regarding the modifications made.

If the InfMF/NSMF cannot perform certain modification operation (e.g. addition of a new BS) on the NSSI because NSSI CCHA consumer does not have the required resources or there is no pre-established agreement (e.g., to add resources if needed), a negotiation can start between the InfMF/NSMF and the NSSI CCHA consumer. And the NSSI CCHA consumer might add (lease) additional resources from the InfM/NSMF and the corresponding service level agreement (SLA) is done by the two parties.

In case, such negotiation is not possible, the InfMF/NSMF informs the NSSMF (i.e., the NSS CCHA Policy Control function) that the required network modification is not possible. In turn, the NSSMF informs the CCHA consumer accordingly.

Figure 6A:
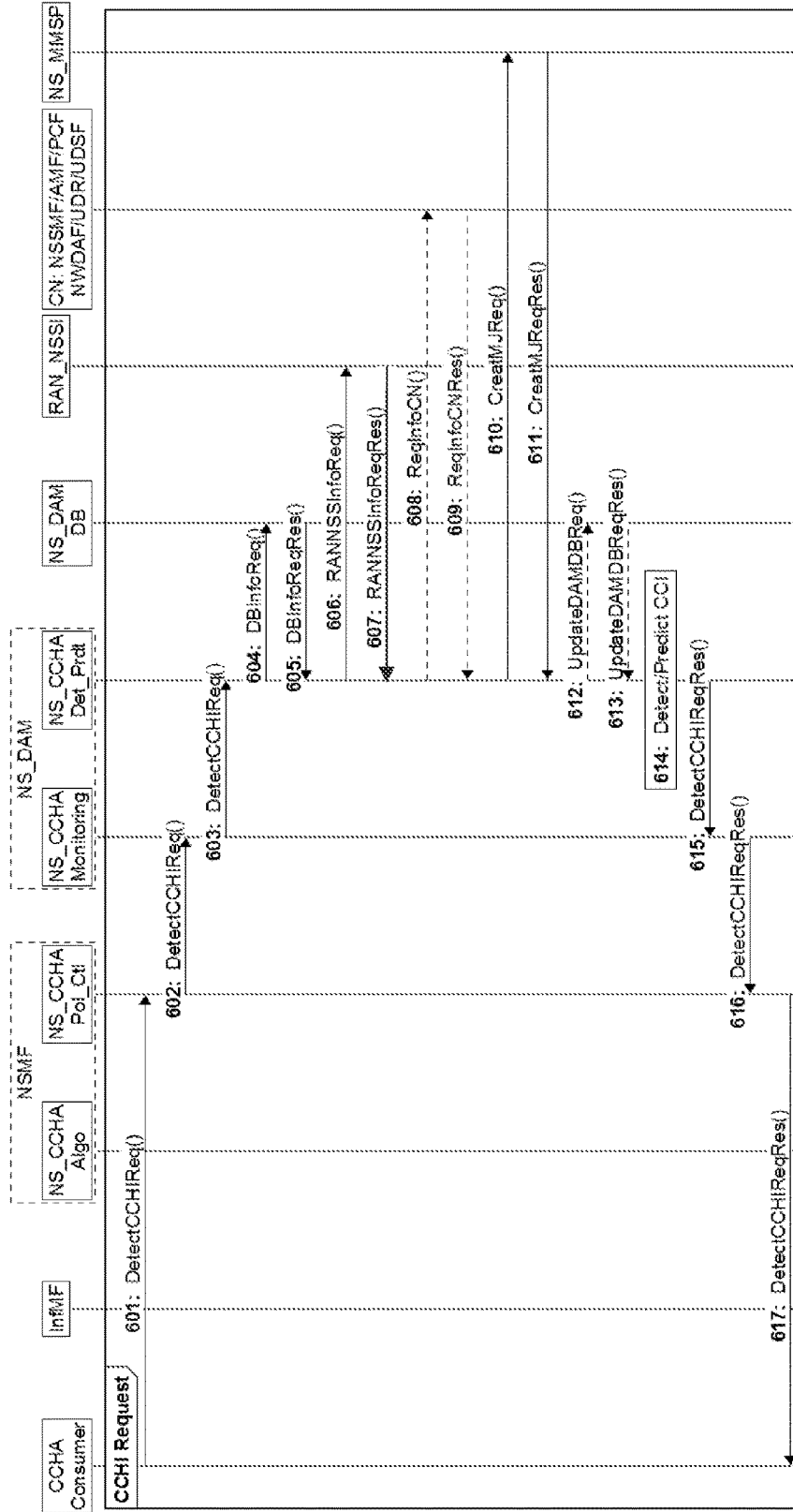
FIGS. 6A and 6B are signaling diagrams for an embodiment of coverage and capacity hole analysis.

Referring to FIG. 6A, a signaling exchange is presented for CCHA and optimization for a network slice instance (NSI).

In step 601, a NSI CCHA consumer (e.g., a virtual network operator) transmits to a NSMF a request for CCH information via DetectCCHIReq( )

In step 602, the NS_CCHA policy control function in a NSMF, which is a NS-DAM MDAS consumer, transmits to the NS_DAM (i.e., the NS CH monitoring function) that is a NS-DAM MDAS provider a request via a DetectCHReq( )operation to provide information on potential capacity deficiencies and capacity holes in the NSI.

In step 603, the NS_CCHA monitoring function transmits to the NS_CCHA detection/prediction function a request to detect/predict CCH for the requested NSI via the DetectCCHIReq( ) function.

The NS_CCHA detection/prediction function collects information required to calculate/analyze the CCH in the requested Network Slice (NS)/NSI:
 a. Received SNR/SNIR as reported by the UEs in the RAN
 b. Mobility information of the UEs e.g.,
 c. handover failure,
 d. inter-RAT handover: from 5G to any 3GPP (e.g., 4G, 3G, etc.) or non-3GPP networks. This information may be collected from AMF and/or NWDA.
 e. link failure experienced by the UEs in a geographic area (e.g., the last cell id, gNB id, tracking area id, etc.)
 f. weak coverage area: the area (e.g., the last cell id, gNB id, tracking area id, etc.) where the reported SINR is insufficient for meeting the SLA requirements of certain services/applications depending on the loading condition of the network.
 g. areas with mismatch between DL and UL channels In step 604, the NS_CCHA detection/prediction function transmits to a NS_DAM DB a request query for any required data. In step 605, the NS_DAM DB transmits to the NS_CCHA detection/prediction function an acknowledgement and/or stored data that is responsive to the request.

Optionally, in step 606 the NS_CCHA detection/prediction function can also collect information from the (virtual) RAN (i.e., RAN NSSI) nodes by transmitting a request to the RAN_NSSI, via the RANNSSInfoReq( ) operation. In step 607 the RAN NSSI transmits an acknowledgement to the NS_CCHA detection/prediction function that may include data responsive to the request. The NS CCHA detection/prediction function can also collect data from any other data analytic functions in the network If the data available from the NS DAM DB is not sufficient, optionally in step 608 the NS_CCHA detection/prediction function may also transmit requests to one or more control plane functions in the core network (CN) in order to collect data from the different control plane functions e.g.:
 a. AMF: mobility, connectivity, location information of UEs
 b. PCF: mobility related policy information
 c. SMF: routing information
 d. NWDAF: QoS/QoE for UEs and the applications used by the UEs.
 e. Data from other data analytics functions, e.g., infrastructure data analytics function, NSI data analytics function, NSSI data analytics function, etc.
 f. UDR/UDSF: structured/unstructured data relating to UE connectivity, mobility and policy In step 609 the control plane function(s) in the CN, or an interface acting on their behalf, transmit an acknowledgment to the NS_CCHA detection/prediction function responsive to the received request. In some implementations the acknowledgement may include data available to that control plane function.

If the NS_CCHA detection/prediction function needs new measurements, in step 610 the NS_CCHA detection/prediction function transmits a request to the NS measurement management service provider (NS_MMSP) to create specific measurement jobs (MJ) for NSI nodes. In step 611 the NS_MMSP may transmit an acknowledgement to the NS_CCHA detection/prediction function. In some implementation the acknowledgement may include results data obtained from the MJ.

In step 612, the NS_CCHA detection/prediction function can (optionally) transmit an update request to the NS_DAM DB to update the NS_DAM DB with the collected information mentioned above via the UpdateDAMDBReq( ) operation. In step 613 the NS_DAM DB may transmit an acknowledgement to the update request. In some embodiments the acknowledgement may further include updated information retained n the NS_DAM DB.

In step 614, using the above information, the NS CCHA detection/prediction function computes a capacity info and coverage hole profile for the NSI, that may include information such as:
 a. Coverage holes in the NSI
 b. Coverage-insufficiency areas on the NSI
 c. Coverage hole and coverage-insufficiency analysis results from the associated NF (e.g., gNB, eNB, other BSs, APs, etc.)-DAM function (if available)
 d. number of active UEs in the NSI
 e. the QoS/QoE profile of each UE in the NSI
 f. average QoS/QoE profile of the UEs in the NSI
 g. number of active sessions in the NSI
 h. QoS/QoE profile of each session in the NSI, etc.
 i. Maximum number of UEs that can be supported in a NSI with their required service QoS/QoE profile In step 615, the NS_CCHA detection/prediction function transmits the CH detection/prediction results to the NS_CCHA monitoring function.

In step 616, the NS_CCHA monitoring function transmits the received CH detection/prediction the results to the NSMF. In step 617, the NSMF transmits the received CH detection/prediction results to the CCHA consumer in response to the initial request.

Figure 6B:
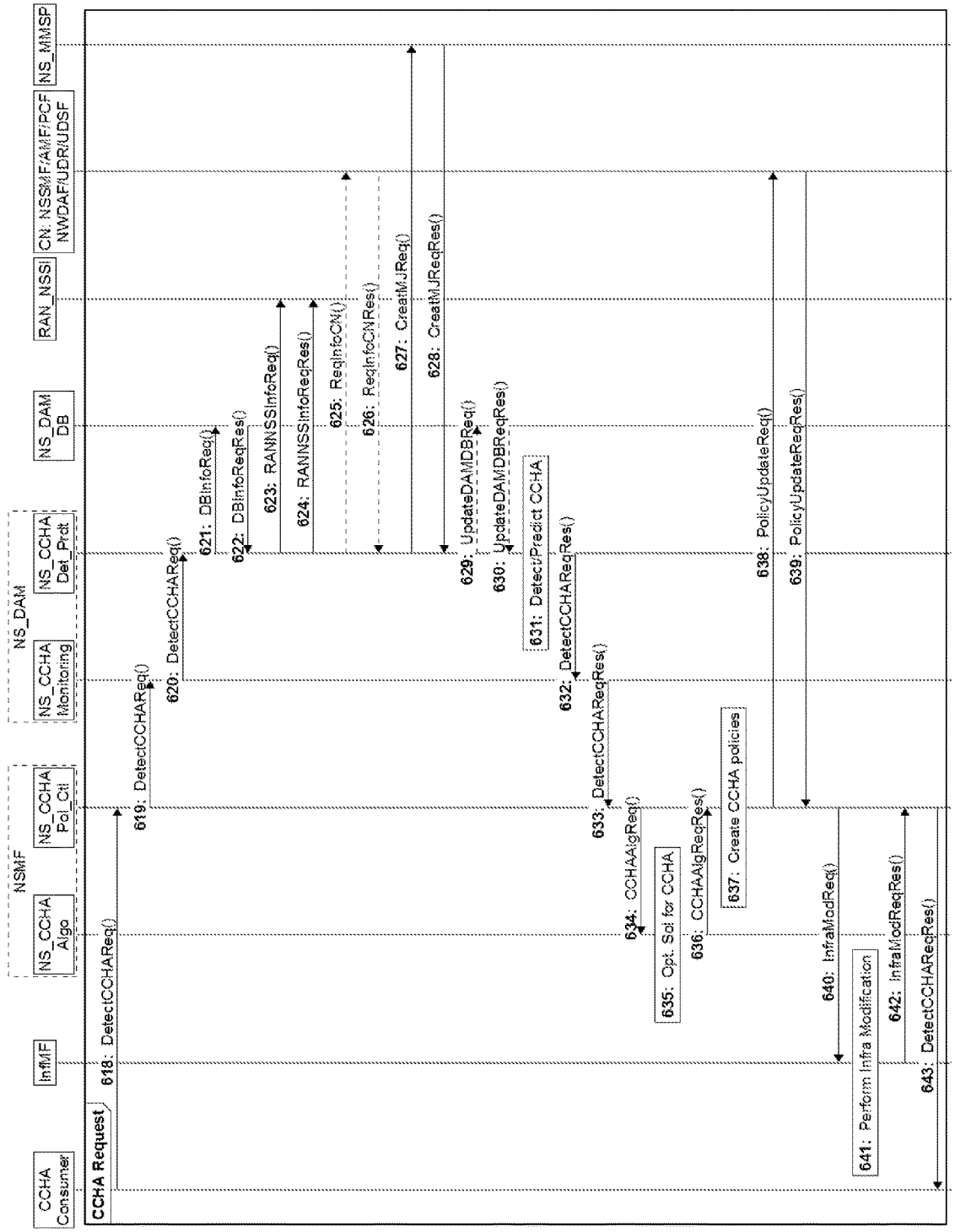

Referring to FIG. 6B, in an embodiment the CCHA consumer may obtain both

NSSI CCHA Information and request potential solutions to optimize or alleviate a potential CCH condition. In step 618, the CCHA consumer transmits to the NS_CCHA policy control function a request for CCH information and a request for a solution to a potential CCH situation via a DetectCCHAReq( ). Steps 619 to 631 are functionally equivalent to steps 602 to 614 above with the exception that step 618 included an additional request for CCH solutions.

After completion of step 631, in step 632 the NS CCHA detection/prediction function transmits the CCH results to the NS_CCHA monitoring function.

In step 633 the NS_CCHA monitoring function transmits the CCH results to the NS_CCHA policy control function of the NSMF.

In step 634, the NS_CCHA policy control function transmits to the NS_CCHA algorithm function a request to devise an appropriate algorithm to alleviate the CCH problem based on the CCH results.

In step 635, the NS_CCHA algorithm function prepares optimized solution for CCH problem alleviation. In step 636, the NS_CCHA algorithm function transmits the solution to the NS_CCHA policy control function.

In step 637, the NS_CCHA policy control function creates/updates policies according to the solution received from the NS_CCHA algorithm function. In optional step 638, the NS_CCHA policy control function may send a policy suggestion to a core network management function (CNMF) e.g., a NSSMF, which in turn may determine whether to update policies for one or more corresponding control plane functions (e.g., AMF, PCF, NWDAF) based on the policy suggestion received from the NS_CCHA policy control function. In step 638, the CNMF may transmit an acknowledgement to the NS_CCHA policy control function. In some embodiments, the acknowledgement may include, for instance, a report of the policies updated by the CNMF.

If infrastructure modification is needed, in step 640 the NS_CCHA policy control function may send an infrastructure modification request to the infrastructure management function (InfM). For instance, the information medication request may include information such as:
 a. DL power adjustment of transmission units
 b. Antenna tilt/azimuth adjustment of transmission units
 c. Sending instruction to change UL transmission frequency to one that does not suffer from the coverage issue in the CH area
 d. Addition of new BSs in the CH area
 e. Cell switch ON/OFF The InfMF may use its own DAM function to find the optimal physical modification policy. In practice, the InfMF can also be a part of the NSMF.

In step 641, the InfMF performs the modifications. In step 642 the InfMF transmits an acknowledgement to the NS_CCHA policy control function. In some implementations, the acknowledgement may include for instance, a report indicating the modifications made by the InfMF to update the NS_CCHA policy control function.

If the InfMF cannot perform certain modification operation (e.g. addition of a new BS) on the NSI because NSI CCHA consumer does not have the required resources or there is no pre-established agreement (e.g., to add resources if needed), a negotiation can start between the InfMF and the NSI CCHA consumer. And the NSI CCHA consumer might add (lease) additional resources from the InfMF and the corresponding service level agreement (SLA) is done by the two parties.

In case, such negotiation is not possible, the InfMF informs the NSMF (i.e., the NS_CCHA Policy Control function) that the required network modification is not possible. In turn, the NSMF informs the CCHA consumer accordingly.

In step 642, the NS_CCHA policy control function transmits a response to the CCHA consumer responsive to the initial request.

As an example, and to further elaborate on the signalling diagrams described above, CCHA operations may include, for instance:

| CCHA Operations/Messages | | |
|---|---|---|
| Message | Requirement | Direction |
| DetectCCHIReq( ) | M | CCHA_MDAS_C -> CCHA_MDAS_P |
| DetectCCHAReq( ) | M | CCHA_MDAS_C -> CCHA_MDAS_P |
| DetectCCHIReqRes( ) | M | CCHA_MDAS_P -> CCHA_MDAS_C |
| DetectCCHAReqRes( ) | M | CCHA_MDAS_P -> CCHA_MDAS_C |

| Input Parameters for DetectCHHAIReq( )/DetectCHHAOReq( ) | | | | |
|---|---|---|---|---|
| Parameter | Qualifier | Cardinality | Content Type | Description |
| ManagedObjectClass | M | 1 | string | Class of the object e.g., a RAN/NSSI/NSI for which CCH has to be analyzed. |
| ManagedObjectInstance | M | 1 | String, a DN[1] | Uniquely defines the instance of the object for which the CCH analysis has to be created. |
| AnalysisType | M | 1 | String | CCH analysis. |
| AnalysisMode | M |  | String | Periodic, threshold-based alarm, etc. |
| [2]AnalysisReportMode | O |  | integer | CCH analysis Reporting mode. |
| AnalysisReportDB | O |  | String | URL of the DB for storing the analysis report. |
| OtherInfo | O |  | String/integer/DN/URL | Any other necessary information. |

[1]A Distinguished Name (DN) uniquely identifies a managed object, e.g., a RAN/NSSI/NSI.
[2]Analysis reporting mode can be signaled by specifying an integer value e.g., 1: response in file format, 2: update the response in a DB, etc.

| Content of DetectCHHAIReqRes( )/DetectCHHAOReqRes( ) | | | | |
|---|---|---|---|---|
| Parameter | Qualifier | Cardinality | Content Type | Description |
| ManagedObjectClass | M | 1 | string | Class of the object e.g., a RAN/NSSI/NSI for which CCH analysis has been created. |
| CCHAnalysisTimeStamp | M | 1 | String | The time duration for which the CCH analysis has been created. |
| CCHAtrributeList | M |  | String/integer (CCH analysis name, value pair) | [3]Capacity and coverage hole information |
| Status | M |  | ENUM (CCH analysis success/failure) | A CCH analysis may fail for a specified or unspecified reason. |
| ManagedObjectInstance | O | 1 | String, a DN | [3]Uniquely defines the instance of the CCH analysis report that has been created. |

Figure 7:
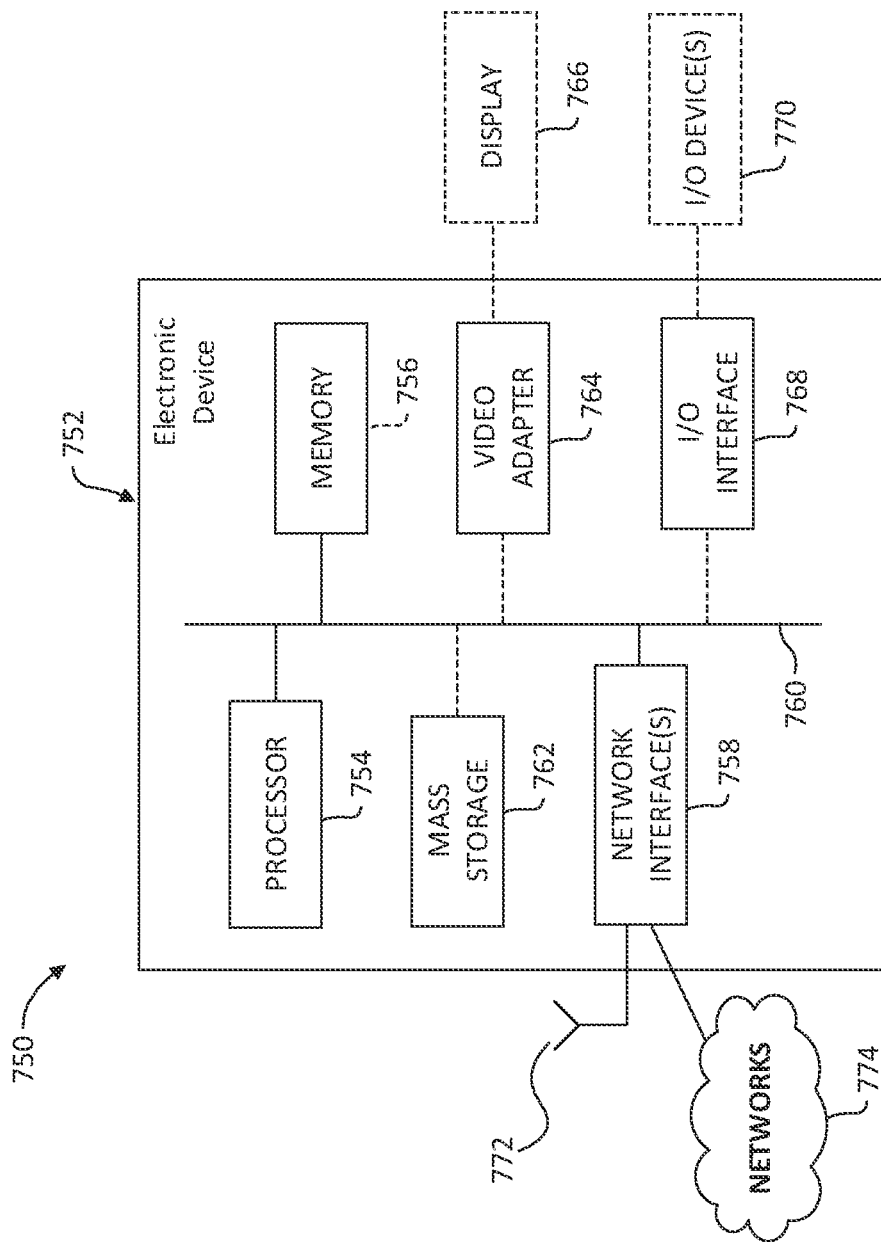
FIG. 7 is a block diagram of an electronic device within a computing and communications environment that may be used for implementing devices and methods in accordance with representative embodiments of the present invention.

[3]CCH information can be specified as the managed object instance id e.g., RAN-1 and the location of the CCH within it e.g., TA-2, TA-3 with the relevant capacity information, e.g., number of UE, service QoS/QoE status, etc. There might be some other ways to indicate the CH location e.g.,

- A geographical coordinate and a radius around it e.g., [(35° 45" N, 67° 45" S), 5 m radius].
- a base station (BS) e.g., gNB, eNB location and specific coverage radius where the CH is detected.
- For an application running on an NSI to ensure the QoS/QoE of the UEs using the application FIG. 7 is a block diagram of an electronic device (ED) 752 illustrated within a computing and communications environment 750 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 752 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 752 typically includes a processor 754, such as a Central Processing Unit (CPU), and may further include specialized processors such as a Graphics Processing Unit (GPU) or other such processor, a memory 756, a network interface 758 and a bus 760 to connect the components of ED 752. ED 752 may optionally also include components such as a mass storage device 762, a video adapter 764, and an I/O interface 768 (shown in dashed lines).

The memory 756 may comprise any type of non-transitory system memory, readable by the processor 754, such as static random access memory (SRAM), dynamic random access memory (DRAM), synchronous DRAM (SDRAM), read-only memory (ROM), or a combination thereof. In an embodiment, the memory 756 may include more than one type of memory, such as ROM for use at boot-up, and DRAM for program and data storage for use while executing programs. The bus 760 may be one or more of any type of several bus architectures including a memory bus or memory controller, a peripheral bus, or a video bus.

The electronic device 752 may also include one or more network interfaces 758, which may include at least one of a wired network interface and a wireless network interface. As illustrated in FIG. 1, network interface 758 may include a wired network interface to connect to a network 774, and also may include a radio access network interface 772 for connecting to other devices over a radio link. When ED 752 is network infrastructure, the radio access network interface 772 may be omitted for nodes or functions acting as elements of the Core Network (CN) other than those at the radio edge (e.g. an eNB). When ED 752 is infrastructure at the radio edge of a network, both wired and wireless network interfaces may be included. When ED 752 is a wirelessly connected device, such as a User Equipment, radio access network interface 772 may be present and it may be supplemented by other wireless interfaces such as WiFi network interfaces. The network interfaces 758 allow the electronic device 752 to communicate with remote entities such as those connected to network 774.

The mass storage 762 may comprise any type of non-transitory storage device configured to store data, programs, and other information and to make the data, programs, and other information accessible via the bus 760. The mass storage 762 may comprise, for example, one or more of a solid state drive, hard disk drive, a magnetic disk drive, or an optical disk drive. In some embodiments, mass storage 762 may be remote to the electronic device 752 and accessible through use of a network interface such as interface 758. In the illustrated embodiment, mass storage 762 is distinct from memory 756 where it is included, and may generally perform storage tasks compatible with higher latency, but may generally provide lesser or no volatility. In some embodiments, mass storage 762 may be integrated with a heterogeneous memory 756.

The optional video adapter 764 and the I/O interface 768 (shown in dashed lines) provide interfaces to couple the electronic device 752 to external input and output devices. Examples of input and output devices include a display 766 coupled to the video adapter 764 and an I/O device 770 such as a touch-screen coupled to the I/O interface 768. Other devices may be coupled to the electronic device 752, and additional or fewer interfaces may be utilized. For example, a serial interface such as Universal Serial Bus (USB) (not shown) may be used to provide an interface for an external device. Those skilled in the art will appreciate that in embodiments in which ED 752 is part of a data center, I/O interface 768 and Video Adapter 764 may be virtualized and provided through network interface 758.

In some embodiments, electronic device 752 may be a standalone device, while in other embodiments electronic device 752 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A network function comprising:
a network interface for receiving data from and transmitting data to a network functions connected to a network;
a processor; and
a non-transient memory storing instructions executable by the processor to cause the network function to:
generate a capacity and coverage hole analysis (CCHA) policy based on capacity and coverage hole (CCH) information of the network, the CCH information being indicative of a network coverage sufficiency and coverage service quality;
apply the generated CCHA policy in modifying capacity and coverage hole conditions within the network;
transmit to a CCHA algorithm function a request to determine an algorithm to address a CCH problem identified from the CCH information; and
receive from the CCHA algorithm function the determined algorithm based on the CCH information;
wherein the CCHA policy is generated based on the determined algorithm.

2. The network function of claim 1 wherein the instructions are further executable to generate the CCHA policy based at least in part on a CCHA algorithm function.

3. The network function of claim 1 wherein the CCHA policy is implemented in accordance with a hierarchical interface architecture.

4. The network function of claim 3 wherein the hierarchical interface architecture comprises at least one of a physical network component and a virtual network component.

5. The network function of claim 4 wherein the physical network component comprises a radio access network (RAN).

6. The network function of claim 4 wherein the virtual network component comprises at least one of a network slice sub-net (NSS) and a network slice instance (NSI).

7. The network function of claim 1, wherein the instructions are further executable to:
transmit to a core network function a request to update one or more control plane functions based on the generated CCHA policy.

8. The network function of claim 1, wherein the instructions are further executable to:
transmit to an infrastructure management function an infrastructure modification request to modify infrastructure of the network to meet the generated CCHA policy.

9. The network function of claim 8, wherein the infrastructure modification request specifies modification to at least one of:
  a. downlink power adjustment of transmission units;
  b. antenna tilt/azimuth adjustment of transmission units;
  c. sending instruction to change uplink transmission frequency to one that does not suffer from the coverage issue in the coverage hole (CH) area;
  d. addition of new base stations (BSs) in the CH area; and
  e. cell switch ON/OFF.

10. The network function of claim 9, wherein resource negotiation is performed to acquire the resources required for the infrastructure modification request and wherein a service level agreement is amended or created as a result of the resource negotiation.

11. The network function of claim 10, wherein the infrastructure management function is informed that the resource negotiations were unsuccessful.

12. A communication system comprising a first network function, a second network function, a capacity and coverage hole analysis (CCHA) monitoring function, and a communication interface supporting a communication between the first network function and the second network function, wherein:
the first network function is configured to:
  receive a request for capacity and coverage hole (CCH) information from a CCHA consumer;
  collect the CCH information responsive to the request; and
  based at least in part on the CCH information, determine a capacity and coverage hole profile that is indicative of at least one of a network coverage sufficiency and coverage service quality;
the second network function is configured to:
  obtain the capacity and coverage hole information of the network from the first network function via the communication interface;
  generate a capacity and coverage hole analysis (CCHA) policy based on capacity and coverage hole (CCH) information of the network, the CCH information being indicative of the network coverage sufficiency and coverage service quality;
  apply the generated CCHA policy in modifying capacity and coverage hole conditions within the network;
  transmit to a CCHA algorithm function a request to determine an algorithm to address a CCH problem identified from the received responsive information; and
  receive from the CCHA algorithm function the determined algorithm based on the received responsive information;
  wherein the CCHA policy is generated based on the determined algorithm.

13. The communication system of claim 12, further comprising the CCHA consumer and a second communication interface, wherein the CCHA consumer is configured to send the request for CCH information to the first network function via the second communication interface.

14. The communication system of claim 12, further comprising at least one of following functions which is configured to provide the CCH information to the first network function:
  a data analytics management database (DAM DB);
  a core network management function (CNMF);
  one or more core network functions or nodes;
  a measurement management service provider (MMSP); and
  one or more radio access network (RAN) nodes.

15. The communication system of claim 12, wherein the CCHA monitoring function is inside or outside the communication system.

16. The network function of claim 12, wherein the capacity and coverage hole profile includes information relating to one or more of:
  coverage holes in a network slice sub-net (NSS);
  coverage-insufficiency areas on a network slice (NS);
  coverage hole and coverage-insufficiency analysis results from an associated network function (NF) data analytics management (DAM) function;
  a number of active user equipment (UE)s in the NSS;
  a quality of service (QoS)/quality of experience (QoE) profile of each UE in the NSS;
  an average QoS/QoE profile of the UEs in the NS;
  a number of active sessions in the NSS; and
  a QoS/QoE profile of each session in the NS.

17. A method comprising:
generating, by a network function, a capacity and coverage hole analysis (CCHA) policy based on capacity and coverage hole (CCH) information of the network, the CCH information being indicative of a network coverage sufficiency and coverage service quality;
applying, by the network function, the generated CCHA policy in modifying capacity and coverage hole conditions within the network;
transmitting, by the network function, to a CCHA algorithm function a request to determine an algorithm to address a CCH problem identified from the CCH information; and
receiving, by the network function, from the CCHA algorithm function the determined algorithm based on the CCH information;
wherein the CCHA policy is generated based on the determined algorithm.

\* \* \* \* \*